(12) United States Patent
Viklund (10) Patent No.: US 11,686,831 B2
(45) Date of Patent: Jun. 27, 2023

(54) SONAR DEVICE WITH HOLDER (71) Applicant: SAAB AB, Linkoeping (SE)

(72) Inventor: Oskar Viklund, Linkoeping (SE)

(73) Assignee: SAAB AB, Linköping (SE)

( * ) Notice: Subject to any disclaimer, the term of this patent is extended or adjusted under 35 U.S.C. 154(b) by 648 days.

(21) Appl. No.: 16/464,798

(22) PCT Filed: Nov. 30, 2016

(86) PCT No.: PCT/SE2016/051187
§ 371 (c)(1),
(2) Date: May 29, 2019

(87) PCT Pub. No.: WO2018/101864
PCT Pub. Date: Jun. 7, 2018

(65) Prior Publication Data
US 2019/0317201 A1    Oct. 17, 2019

(51) Int. Cl.
*G01S 7/521* (2006.01)
*G01S 15/04* (2006.01)
*H04R 31/00* (2006.01)

(52) U.S. Cl.
CPC .............. *G01S 7/521* (2013.01); *G01S 15/04* (2013.01); *H04R 31/00* (2013.01)

(58) Field of Classification Search
CPC .... B60S 1/023; B60S 1/62; B60S 1/56; B60S 1/485; G08B 21/24; G08B 21/02; G08B 7/06; B60R 25/305; B60R 25/104; B60R 25/01; B60R 25/24; B60R 1/12; B60R 2001/1253; B60R 2001/1215; B60R 2025/1013; G01S 7/521; G01S 15/04; H04R 31/00
See application file for complete search history.

(56) References Cited

U.S. PATENT DOCUMENTS 2,939,970 A    6/1960    Dranetz et al.
3,221,296 A    11/1965   Milne
(Continued)

FOREIGN PATENT DOCUMENTS

DE    102012210513 A1 * 12/2013 ........... G10K 11/165
EP    1993322 A1    11/2008
(Continued)

OTHER PUBLICATIONS

Translation of WO 2016071961 A1 (Year: 2022).*
(Continued)

*Primary Examiner* — Daniel L Murphy
*Assistant Examiner* — Amie M Ndure
(74) *Attorney, Agent, or Firm* — Alston Bird LLP (57) ABSTRACT

The present disclosure relates to a Sonar device (1) for detection of underwater objects. The sonar device (1) comprises a body element (2) comprising a piezo electric element (3). The sonar device further comprises a holder (4) adapted to hold the piezo electric element (3). The holder (4) is arranged to centre the piezo electric element (3) within said body element (2). The holder (4) is arranged such that the piezo electric element (3) is held firmly in place and also provide for that detection can be made omni-directionally. A method for manufacturing a holder (4) and a sonar device (1) is also disclosed.

10 Claims, 8 Drawing Sheets

(56) References Cited

U.S. PATENT DOCUMENTS

| | | | |
|---|---|---|---|
| 3,732,535 A * | 5/1973 | Ehrlich | B06B 1/0637 367/164 |
| 4,085,400 A * | 4/1978 | Cluzel | B06B 1/0655 367/157 |
| 6,029,113 A | 2/2000 | Woodall | |
| 8,638,640 B2 | 1/2014 | Brown et al. | |
| 2002/0110256 A1 * | 8/2002 | Watson | H04R 3/04 381/189 |
| 2002/0159336 A1 * | 10/2002 | Brown | B06B 1/0633 367/138 |
| 2003/0209383 A1 * | 11/2003 | Whitman Fox | H04R 5/027 181/158 |
| 2003/0227826 A1 * | 12/2003 | Butler | H04R 17/00 367/164 |
| 2004/0000838 A1 * | 1/2004 | Toda | G10K 9/22 310/311 |
| 2007/0132567 A1 * | 6/2007 | Schofield | B60R 11/0247 340/438 |
| 2007/0171037 A1 * | 7/2007 | Schofield | B60R 1/00 340/438 |
| 2007/0195647 A1 * | 8/2007 | Butler | B06B 1/0618 367/153 |
| 2008/0144441 A1 | 6/2008 | Colangelo | |
| 2008/0168841 A1 * | 7/2008 | Matsuo | G10K 9/122 73/649 |
| 2008/0212215 A1 * | 9/2008 | Schofield | B60R 11/04 359/844 |
| 2009/0064403 A1 * | 3/2009 | Wolfe | G08B 21/082 4/504 |
| 2010/0087687 A1 * | 4/2010 | Medoff | C08J 3/28 568/840 |
| 2012/0112604 A1 | 5/2012 | Hasegawa | |
| 2013/0272098 A1 * | 10/2013 | Cahalan | B63C 11/26 367/134 |
| 2015/0158052 A1 * | 6/2015 | Latev | B32B 37/12 310/316.01 |
| 2016/0041259 A1 * | 2/2016 | Chowdhury | G01S 7/52 367/140 |

FOREIGN PATENT DOCUMENTS

| | | | | |
|---|---|---|---|---|
| GB | 2120902 A | | 12/1983 | |
| KR | 10-1081876 B1 | | 11/2011 | |
| WO | WO 2016/071961 A1 | | 5/2016 | |
| WO | WO-2016071961 A1 | * | 5/2016 | G01S 7/521 |

OTHER PUBLICATIONS

Wu, Xiaodong, et al.: "Robotics Echolocation Test Platform", In the proceedings of 2015 IEEE International Conference on Electro/Information Technology, May 21, 2015, pp. 558-562, IEEE, USA.

European Patent Office, Extended European Search Report received for Application No. 16922829.3, dated Jul. 3, 2020, 9 pages, Germany.

International Searching Authority, International Search Report and Written Opinion for International Application No. PCT/SE2016/051187, dated Sep. 1, 2017, 11 pages, Swedish Patents and Registration Office, Sweden.

* cited by examiner

SONAR DEVICE WITH HOLDER

CROSS REFERENCE TO RELATED APPLICATIONS

This application is a National Stage Application, filed under 35 U.S.C. 371, of International Application No. PCT/SE2016/051187, filed Nov. 30, 2016; the contents of which is hereby incorporated by reference in its entirety.

BACKGROUND

Related Field

The present disclosure relates to a sonar device, a method of manufacturing a holder for the sonar device, and a method of manufacturing the sonar device itself.

Description of Related Art

A Sonar is an active or passive devices used for detecting objects under water They can detect sound waves in a wide spectrum from infrasound to ultra sound waves. In general the sonar devices that are made for directional receiving of sound waves under water, but they can also be arranged to receive waves from several directions. These devices are often difficult to manufacture.

BRIEF SUMMARY

In order to achieve a well operable sonar device for detection of underwater objects, in particular for under water operation, there is a need for a sonar device that is able to detect omni-directionally of the sonar. Such sonar cannot be damped in any of the directions. There is a need to manufacture such a device in a simple manner. The present invention is intended to solve at least one of the above problems and is related to a sonar device for detection of underwater objects. The sonar device comprises a body element. The body element comprises a piezo electric element. The sonar device further comprises a holder adapted to hold the piezo electric element, wherein the holder is arranged to centre the piezo electric element within said body element, and wherein said holder is arranged such that the piezo electric element is held firmly in place and also provide for that detection can be made omni-directionally.

The advantage of the disclosed subject matter is that the holder of the piezo electric element holds the piezo electric element firmly in place during both manufacturing of the sonar device and in use. By using a non-damped holder the sensitivity of the sonar device can be increased.

According to a further development of the sonar device above there is suggested a piezo electric element that has a full spherical shape.

The advantage of this is that a full sphere can detect in any direction with an equal sensitivity as the piezo electric element always has an exposure by its periphery to any possible source of sound waves.

According to a further development of the sonar device above it has the body element filled with resin.

This makes the sonar device water proof and further holds the piezo electric element even better in position when in operation.

According to one aspect of sonar device according to the above, the holder engages the piezo electric element at separate engaging areas.

This is particularly favourable, as by having engaging areas including one or more engaging points for engagement of the piezo electric element, there is no damping interference compared with for example a damped holder having for example a bowl shape, and detection from any direction is more easily achieved.

According to another aspect of the sonar device above, the holder engages the piezo electric element at three to twelve separate engaging areas including one or several engaging points, preferably at three separate engaging areas.

This arrangement still arranges for a good hold of the piezo electric element. By increasing the number of engagement areas, i.e. arms, the stability of the holder can be altered, for example depending on environment temperatures and the material chosen for the holder.

According to a preferred aspect of the sonar device above the separate engaging areas are distributed in a symmetric pattern to the piezo electric element.

Symmetry gives better options with regard to holding stability but also with regard to equal sensitivity and detection ability for the complete sonar device, in particular for sound waves coming from any direction.

According to a further development of the sonar device above, the holder has a further cavity where the electronics needed for the sonar device is directly comprised within the structure of the holder.

The advantage of this is that the electronics is given a good position, and if no opening to the surroundings is provided the electronics can be completely protected from all sides by the holder structure.

According to a preferred aspect of the sonar device above, at least the holder is a layer on layer element as provided by manufacturing by a reciprocating three dimensional printing device.

The layer on layer element gives a particular advantage when designing the holder of the piezo electric element. The element can be chosen to have any shape and be very precisely manufactured in a non-limiting way. For example there can with conventional cutting technologies be difficulties in reaching with cutting tools, inside the structure.

The invention also relates to method of manufacturing a holder for a sonar device according to any of the claims above, comprising the steps of:
  s1. providing a reciprocating three dimensional printing device,
  s2. providing an input data to said reciprocating three dimensional printing device that gives instruction to print a holder for a piezo electric element.

Then method further is related to the aspect that:
  the input data of step s2 gives instruction to provide the holder with separate engaging areas for the piezo electric element.

The invention also relates to a method of manufacturing a sonar device according to any development or aspect above. The method of manufacturing a sonar device comprises
  s3. obtaining a holder according to the method manufacturing a holder as defined above,
  s4. positioning a piezo electric element in said holder,
  s5. providing a body element into which said holder comprising the piezo electric element is inserted,
  s6. providing a resin and filling the body element with said resin and covering at the same time said holder and piezo electric element.

The advantage of the above method is that a sonar device is more easily manufactured. The adaptation of the sonar device is very simple. Further the method allows for cavities to be produced within the holder structure for the sonar device. This provides for a much less complex holder for the piezo electric element of the sonar device that need not be made from several different materials.

Step s6 further improves the sonar device as the resin aids in holding the piezo electric element and further adds water proofing.

DETAILED DESCRIPTION OF VARIOUS EMBODIMENTS

Figure 1:
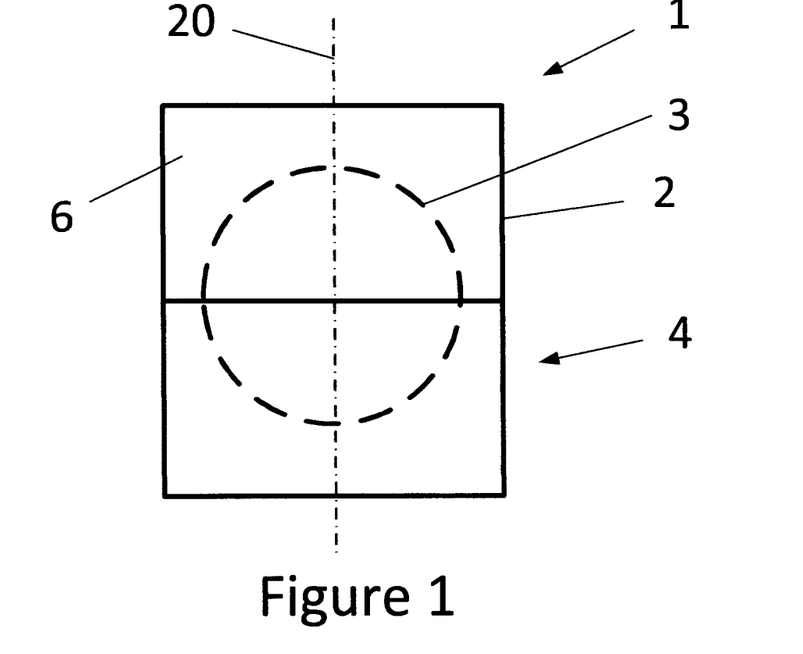
FIG. 1 discloses a sonar device according to the invention from the side.
Figure 2:
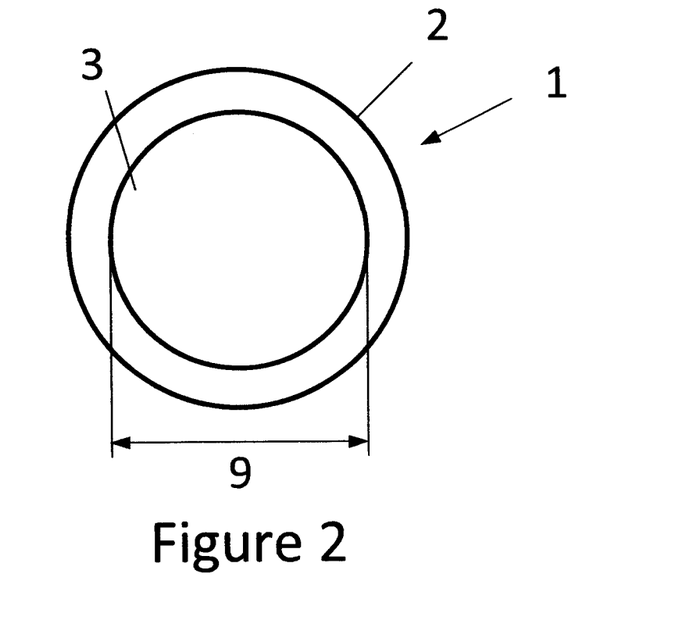
FIG. 2 discloses the sonar device of FIG. 1 from above.
Figure 3:
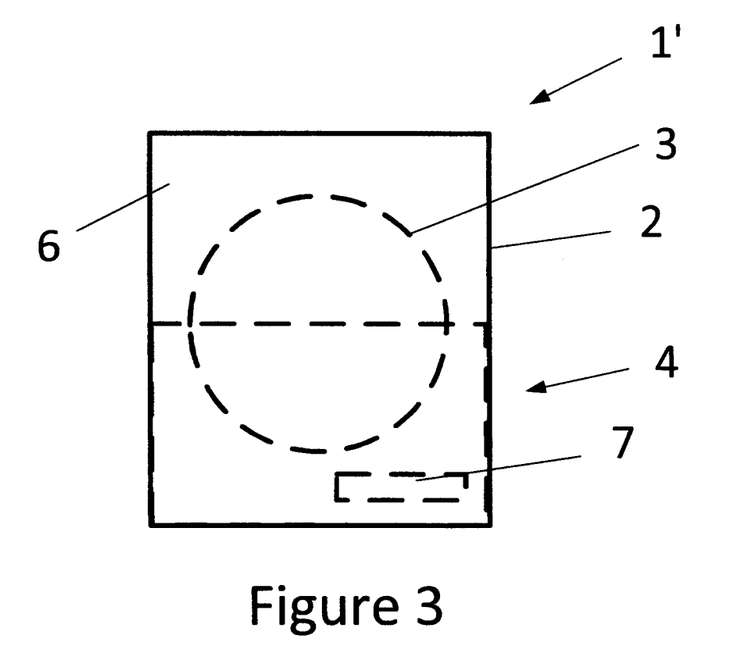
FIG. 3 discloses a sonar device with a cavity for electronics within the holder for the piezo electric element.
Figure 4:
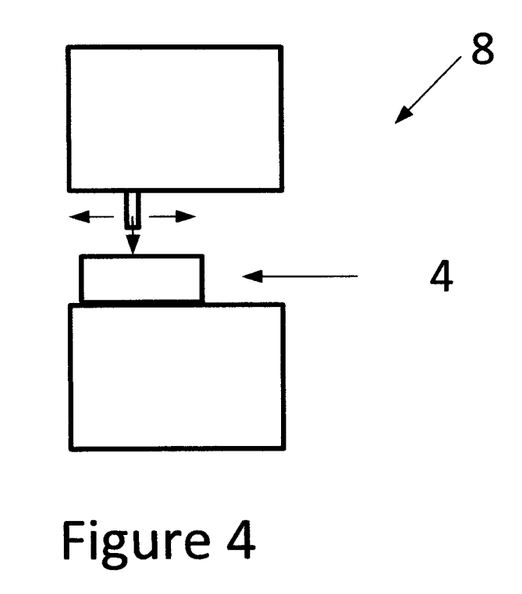
FIG. 4 discloses a reciprocating three dimensional printing device.

The present disclosure relates to sonar devices 1 for detection of underwater objects according to FIG. 1-3.

The sonar device 1 for detection of underwater objects comprises a body element 2. The body element 2 is the element that forms the outer perimeter of the sonar device 1. As exemplified by FIG. 2 the body element is disclosed as having a circular cylinder shape. The cylinder shape is suitable for a sonar device as it is essentially uniform in a transversal plane as shown in FIG. 2. Even though the cylindrical shape is preferred, the shape of the sonar device can be spherical, or in other ways regular.

A central symmetry line 20 can be seen in FIG. 1 but is valuable for all figures when the sonar device 1 is symmetrical in at least a longitudinal direction.

The sonar device 1 comprises a piezo electric element 3. The shape of the piezo electric element 3 is preferably spherical, as shown in FIGS. 1, 3, 4 and 6-9. In FIGS. 1 and 3, the piezo electric element 3 is disclosed with a dashed line, as it is positioned inside the body element 2, and not visible in when the sonar device 1 is in operation. The piezo electric element 3 is preferred to be a hollow sphere.

The piezo electric element 3 is preferably made of a ferroelectrics material for example barium titanate or lead zirconate titanate or a piezo ceramic material. A spherical diameter 9 applies as the largest diameter of the piezo electric element 3.

The piezo electric element 3 is held by a holder 4. The holder 4 is according to the aspect of the disclosure not to provide any intended damping effect. The holder 4 is engaging the piezo electric element 3 at separate engaging areas. Thus it should be understood that small damping effects that are inevitable should be comprised within the present disclosure, however the intention is to achieve a holder without any general damping. The reason for this is that it is desired to be able to detect sound waves omni-directionally. If damping in one direction is occurring this direction can be excluded from detection/listening.

The holder 4 is positioned concentric with the body element 2 in the lower part of the body element 2. The piezo electric element 3 is positioned in the holder 4. The body element 2 is preferred to be filled with a resin 6 that also enclose the holder 4 and the piezo electric element 3.

Figure 5:
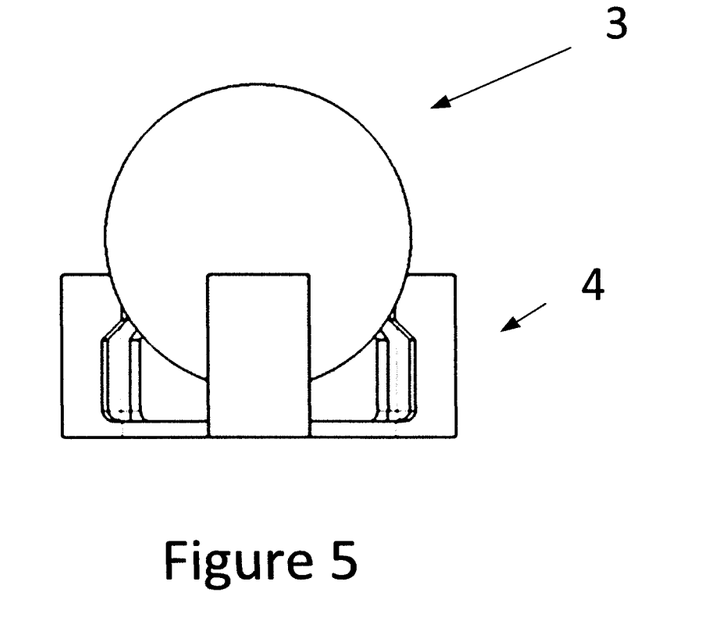
FIG. 5 discloses a piezo electric element and a holder according to a preferred disclosure.
Figure 5A:
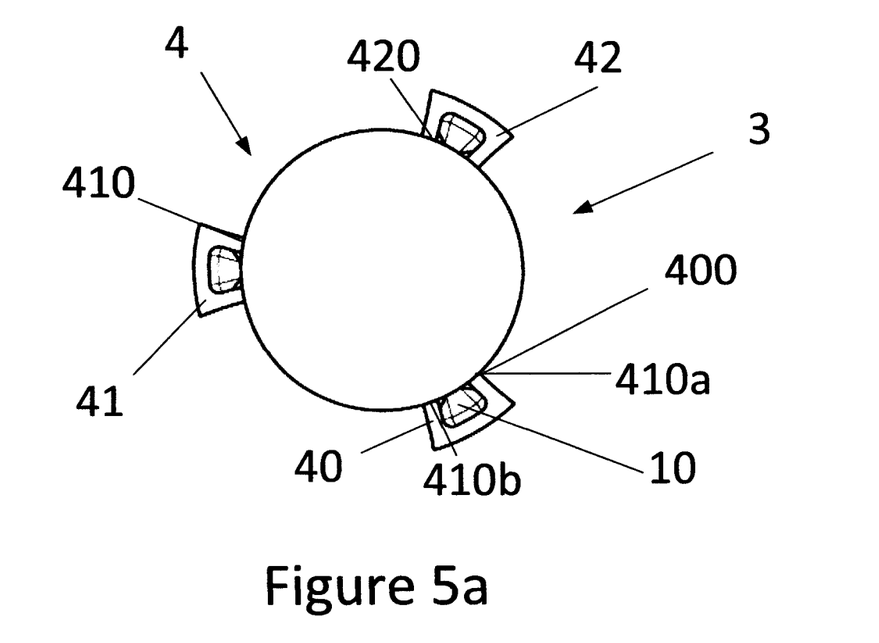
FIG. 5a discloses a piezo electric element and a holder according to a preferred disclosure.
Figure 5B:
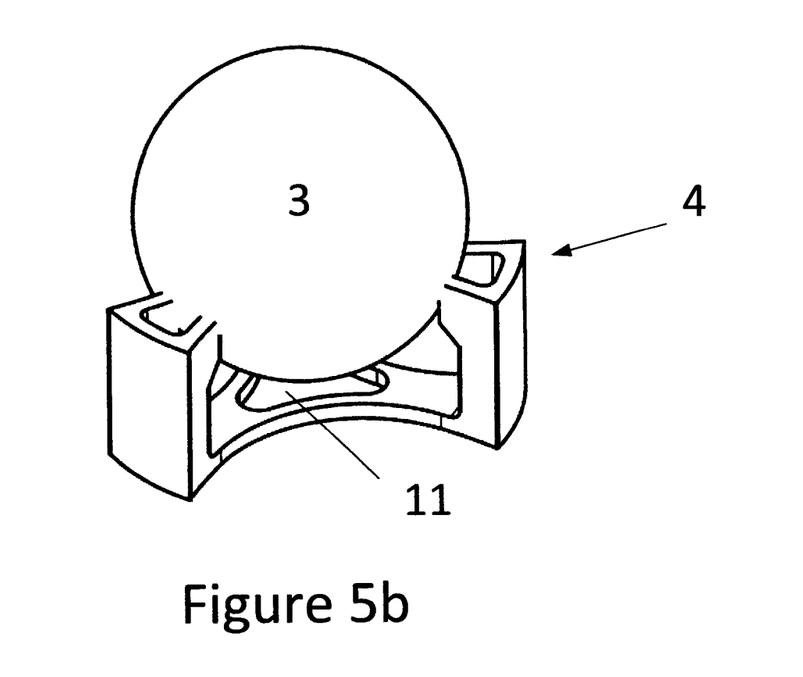
FIG. 5b discloses a piezo electric element and a holder according to a preferred disclosure.
Figure 6:
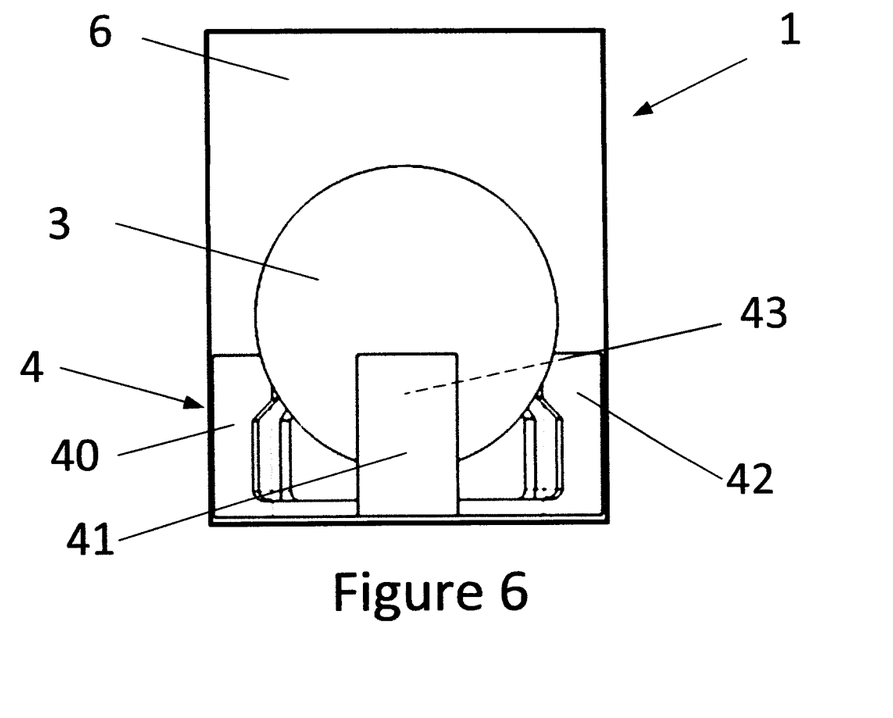
FIG. 6 discloses a sonar device in a preferred disclosure.
Figure 7:
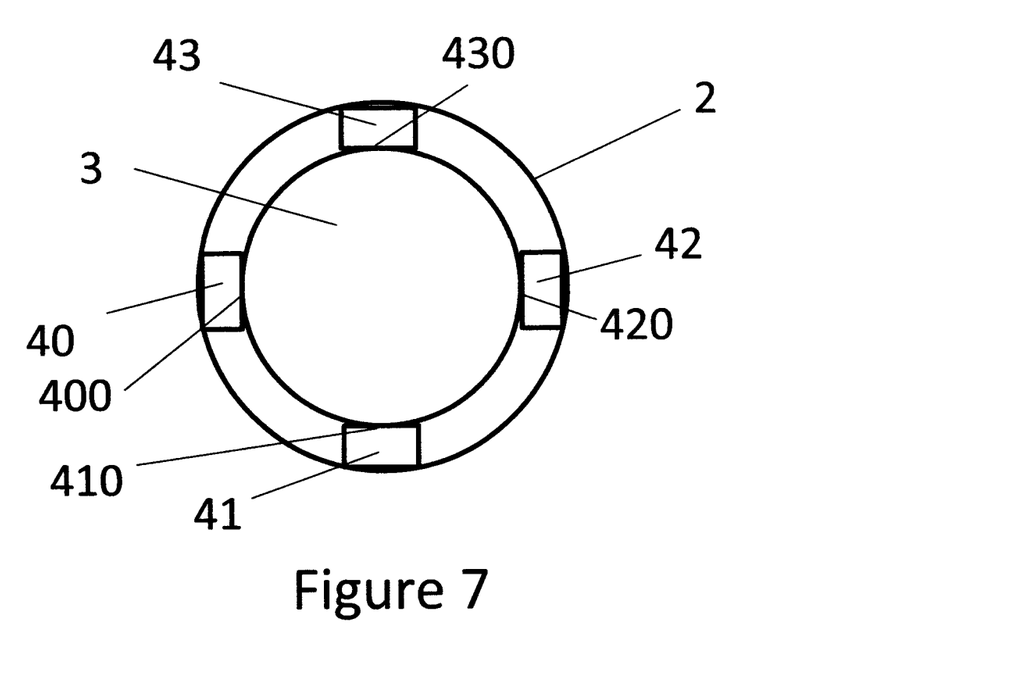
FIG. 7 discloses the said sonar device from above with four holder arms.
Figure 7A:
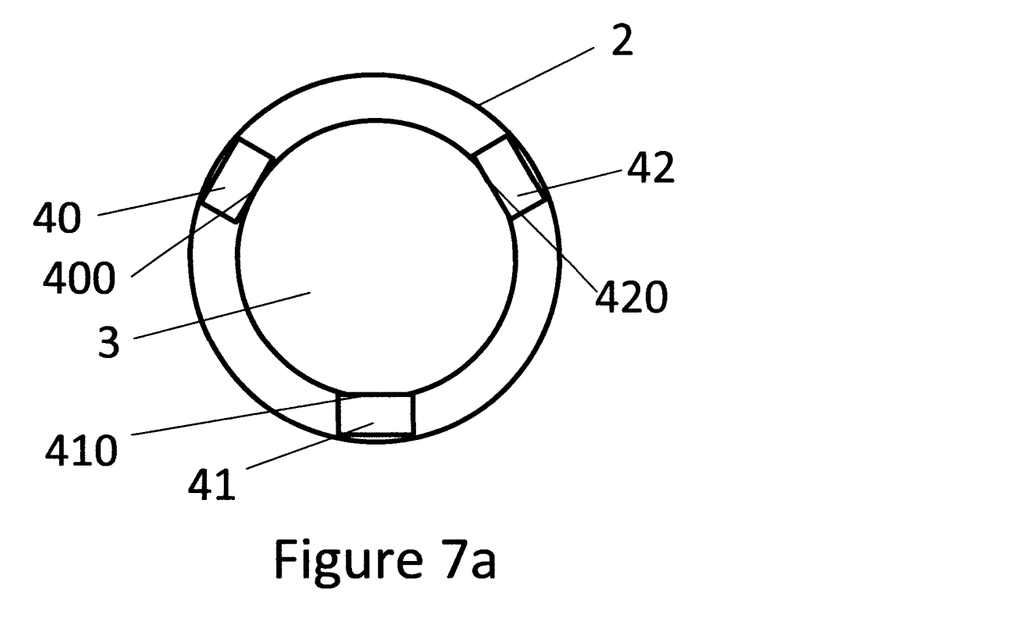
FIG. 7a discloses the said sonar device from above with three holder arms.
Figure 8:
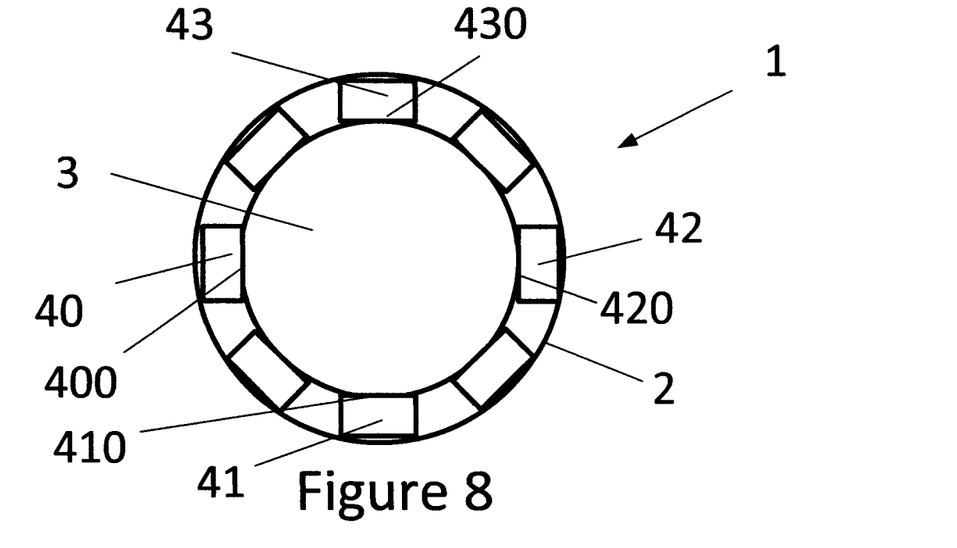
FIG. 8 discloses the said sonar device from above with eight holder arms.
Figure 9:
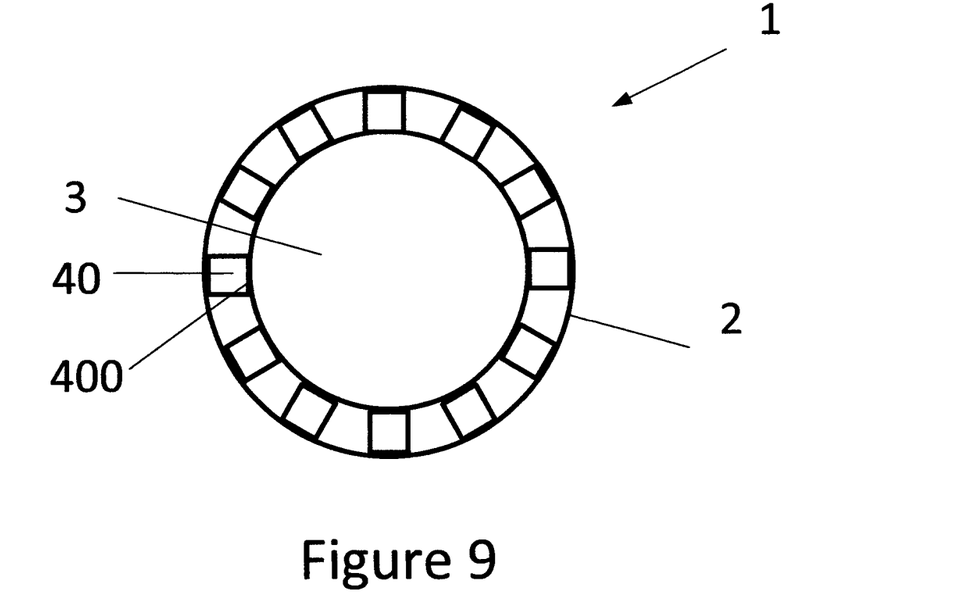
FIG. 9 discloses the said sonar device from above with twelve holder arms.

An example of a holder 4 is disclosed in FIG. 3. This holder has a half spherical shape and provides a particularly good hold for the piezo electric element 3. Another preferred disclosure of the holder 4 is disclosed in FIGS. 5, 5a, 5b and 6. This exemplified holder 4 is made from three arms 40, 41, 42. These three arms are engaged with the piezo electric element 3 at three respective separate engagement areas (400, 410, 420). As can be seen in figure 5a the separate engagement areas have preferably a recess 10, thus the separate engagement areas have two points as exemplified by the separate engaging area 41 with points 410a and 410b, where the separate engaging area 41 engage the piezo electric element 3. This gives better sonic properties and increased stability. Preferably all exemplified holders have a recess 11 in the bottom structure. The recess 11 provides for sound waves propagating without interfering with the holder structure. The structure of the holder 4 very closely follows the piezo electric element 3, such that a particular firm hold is achieved. The disclosure is not limited to three arms. It is thinkable to have any number of arms. However it is of importance that the arms are distributed in a symmetric pattern around the piezo electric element 3 at least for stability reason. As an example FIGS. 7, 8, and 9 discloses a four to twelve arm configuration. The separate engaging areas (400, 410, 420, 430 . . . ) are distributed in a symmetric pattern to the piezo electric element (3), by a likewise number of symmetrical arms (40, 41, 42, 43 . . . ).

In a preferred aspect of the disclosure the holder 4 is a layer on layer element. As disclosed in FIG. 4 by using a reciprocating three dimensional printing device 8 for manufacture of the holder 4 it is possible to perfectly match the dimensions of the piezo electric element 3. It is also possible to perfectly match the body element 2 such that a very good hold of the piezo electric element 3 is achieved.

Further, the use of a layered on layer element as a holder 4 manufactured by a reciprocating three dimensional printing device 8 makes it is possible to incorporate within the holder structure itself the electronic equipment 7. This electronic equipment 7 is needed for the operation of the sonar device 1. Also wiring can be incorporated for the electronics. The electronic equipment 7 can be fully incorporated but it is also possible to have an opening to the surroundings for easy access form outside to the electronic equipment 7.

Preferably the sonar device as disclosed in FIGS. 1-3, is filled with a resin 6 after installation of the piezo electric element 3. The resin is preferably temperature resistant. The resin has preferably the ability to prevent water from entering the sonar device 1 and to thereby prevent damage the piezo electric element 3. The resin can for example be of urethane or nylon or other suitable resin.

Figure 10:
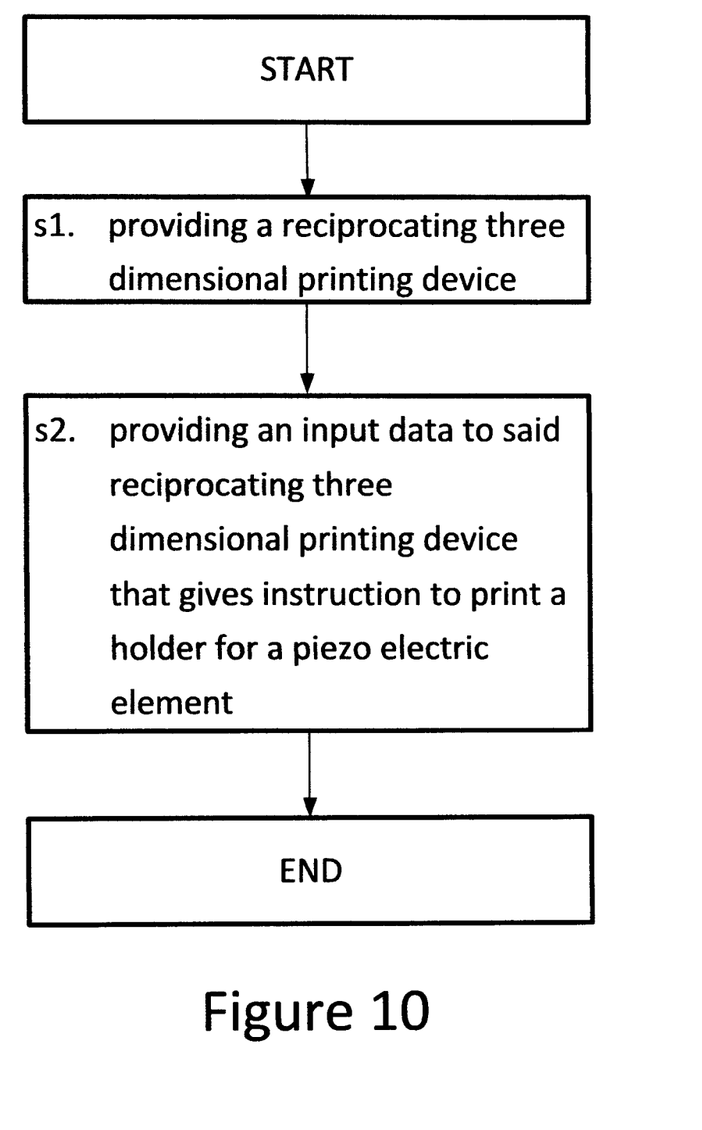
FIG. 10 is a flow chart for manufacturing a holder for a sonar device.

The disclosure also relates to a manufacturing method of a holder 4 for a sonar device 1 of FIGS. 1-3 according to FIG. 10. The method uses at least for some steps of the manufacturing a three dimensional printing device 8. The manufacturing method comprises a step of:

s1. providing a reciprocating three dimensional printing device

In this step s1 a suitable reciprocating three dimensional printing device 8 is provided. The device can be any device. However, the device must be suitable for providing a layer of for example resin that does not interfere with the piezo electric device 3.

The manufacturing method comprises further a step of s2. providing a data input to said reciprocating three dimensional printing device that gives instruction to print a holder for a piezo electric element, In this step s2 the inner structure and inner dimensions with the outer dimensions of the holder 4 is set. This must of course be adapted to the chosen piezo electric element, its dimensions and the material of it. By altering the input data to the reciprocating three dimensional printing device the holder can be arranged such that it sufficiently holds the piezo electric element during manufacturing and operation of the finished sonar device. Preferably the input data of step s2 gives instruction to provide the holder with separate engaging areas for the piezo electric element.

Figure 11:
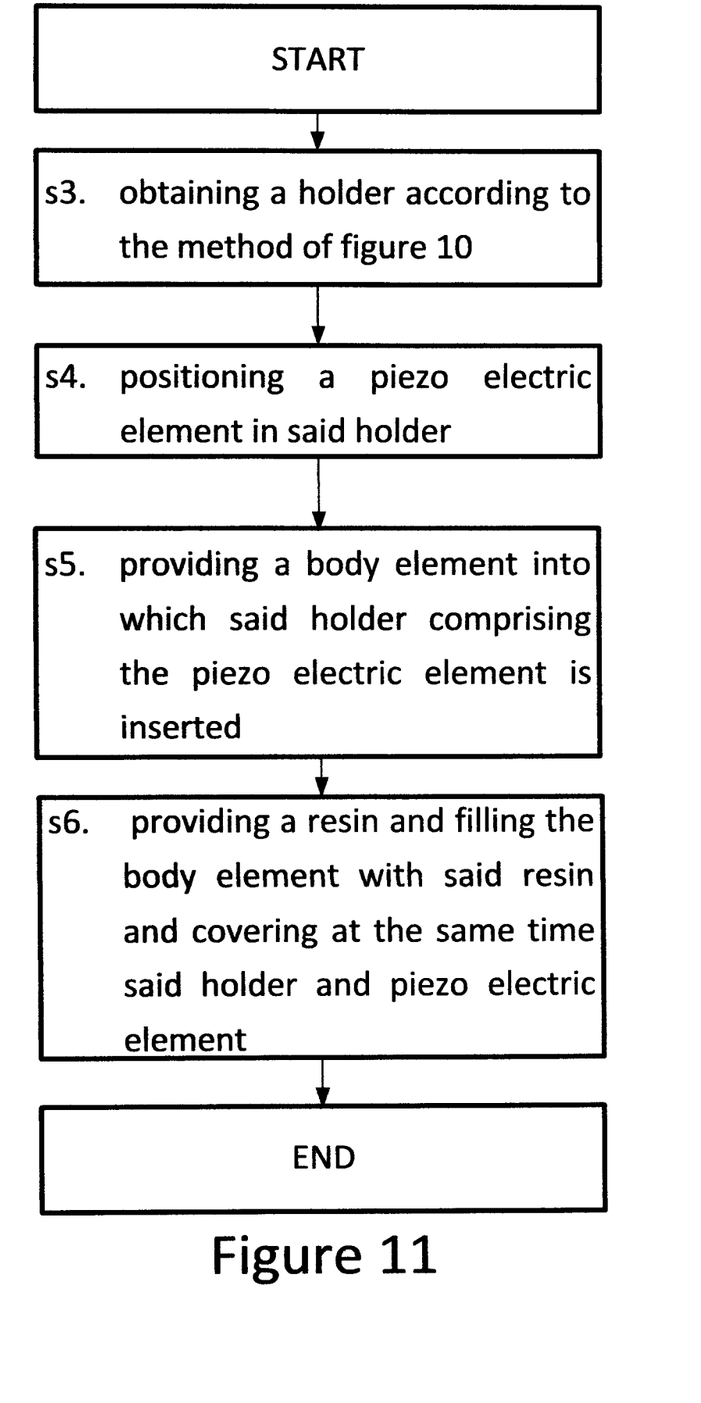
FIG. 11 is a flow chart of a method for manufacturing a sonar device.

The disclosure further relates to a method according to FIG. 11 of manufacturing a sonar device 1 comprising the holder as manufactured according to the above. The method of manufacturing a sonar device comprises the steps of s3 obtaining a holder according to the method above with steps s1 and s2.

s4. positioning a piezo electric element in said holder,

Step s3 provides for a holder before steps s5 and s6. The piezo electric element needs to be positioned at a certain position and not move around when the manufacture of the sonar device is finished.

The method further comprises the step of s5. providing a body element into which said holder comprising the piezo electric element is inserted.

By inserting the piezo electric element before introducing the package of piezo electric element and the holder to the body element, the holder can also guide the insertion to the body element, and also protect the piezo electric element during the insertion.

The method further comprises the step of s6. providing a resin and filling the body element with said resin and covering at the same time said holder and piezo electric element at the same time.

The resin filling 6 is important for preventing water to enter into contact with the piezo electric element. The resin filling 6 also additionally gives a stabilizing effect on the piezo electric element in cooperation with the holder 4, thus improving the stability of the complete sonar device 1.

The invention claimed is:

1. Sonar device (1) for detection of underwater objects, said sonar device (1) comprising:

a body element (2) comprising a piezo electric element (3), and a holder (4) for holding the piezo electric element (3), wherein:

said holder (4) has a planar portion and three to twelve arms (40, 41, 42) extending at a right angle relative to said planar portion, each of said three to twelve arms (40, 41, 42) having a U-shaped profile defining two separate engagement points (410a, 410b) and a space therebetween, said holder (4) is arranged to center the piezo electric element (3) within said body element (2), said holder (4) is arranged such that the piezo electric element (3) is held firmly in place by said three to twelve arms (40, 41, 42), said holder (4) is arranged to provide for omni-directional detection, and said holder (4) engages the piezo electric element (3) at three to twelve separate engaging areas (400, 410, 420) defined by said three to twelve arms (40, 41, 42) and further separated by a non-engaging area between each adjacently positioned of the three to twelve separate engaging areas (400, 410, 420).

2. Sonar device (1) according to claim 1, wherein the piezo electric element (3) has a half spherical shape or a full spherical shape.

3. Sonar device (1) according to claim 1, wherein:

the body element (2) is filled with a resin (6) such that the sonar device (1) is water-proof, and the body element (2) further holds the piezo electric element (3) in position.

4. Sonar device (1) according to claim 1, wherein the holder (4) has a half spherical bowl shape.

5. Sonar device (1) according to claim 1, wherein the separate engaging areas (400, 410, 420) are symmetrically distributed around a circumference of the piezo electric element (3).

6. Sonar device (1) according to claim 1, wherein the holder (4) has a cavity positioned intermediate said three to twelve arms (40, 41, 42) and where the electronics (7) needed for the sonar device (1) is directly comprised within the structure of the holder (4).

7. Sonar device (1) according to claim 1 wherein at least the holder (4) is a layer on layer element as provided by manufacturing by a reciprocating three dimensional printing device (8).

8. Sonar device (1) according to claim 1, wherein the three to twelve separate engaging areas (400, 410, 420) consist of three separate engaging areas.

9. Sonar device (1) according to claim 1, wherein the three to twelve separate engaging areas (400, 410, 420) each have two engagement points (410a, 410b) separated by a recess (10), each of the two engagement points separately engaging the piezo electric element (3).

10. Sonar device (1) according to claim 1, wherein the holder (4) has a recess (11) in a bottom surface thereof.

* * * * *

UNITED STATES PATENT AND TRADEMARK OFFICE
CERTIFICATE OF CORRECTION

| | |
|---|---|
| PATENT NO. | : 11,686,831 B2 |
| APPLICATION NO. | : 16/464798 |
| DATED | : June 27, 2023 |
| INVENTOR(S) | : Oskar Viklund |

It is certified that error appears in the above-identified patent and that said Letters Patent is hereby corrected as shown below:

On the Title Page

In Column 2, item (74), Attorney, Agent, or Firm, Line 1, delete "Alston Bird LLP" and insert -- Alston & Bird LLP --, therefor.

Signed and Sealed this
Twelfth Day of November, 2024

Katherine Kelly Vidal
*Director of the United States Patent and Trademark Office*